United States Patent [19]
Griffin

[11] Patent Number: 5,256,306
[45] Date of Patent: Oct. 26, 1993

[54] CONTINUOUS TREATMENT OF CHROMIUM BEARING WASTE WATER

[76] Inventor: Gus M. Griffin, 422 Country La., Louisville, Ky. 40207

[21] Appl. No.: 772,169

[22] Filed: Oct. 7, 1991

[51] Int. Cl.$^5$ .............................................. C02F 1/62
[52] U.S. Cl. ..................................... 210/720; 210/724; 210/913; 210/757; 423/55; 423/607
[58] Field of Search ............... 210/720, 724, 743, 757, 210/912, 913; 423/55, 607

[56] References Cited

U.S. PATENT DOCUMENTS

| | | | |
|---|---|---|---|
| 3,537,896 | 11/1970 | Nohse et al. | 210/720 |
| 4,268,486 | 5/1981 | Noack et al. | 210/913 |
| 4,367,213 | 1/1983 | Fiorucci et al. | 210/720 |

*Primary Examiner*—Stanley S. Silverman
*Assistant Examiner*—Neil M. McCarthy

*Attorney, Agent, or Firm*—Edward M. Steutermann

[57] ABSTRACT

The present invention provides a composition and process for the treatment of waste water containing chromium compound, for example water from a plating operation which includes significant concentration of a toxic chromium compound such as chromic acid. The chromium bearing solution is mixed with sufficient amount of hydrazine which can include selected minor concentrations of a cobalt salt to react with the chromium compound and render it insoluble. The chromium bearing water is introduced to a vessel which can have a baffle so that water introduced on one side of the baffle flows along a side of, then under the baffle and overflows on the other side. The hydrazine, which can include cobalt salt, is introduced to the incoming water at a rate to control the pH of the effluent from the vessel at a selected value of pH sufficient to remove all chromium from the effluent.

3 Claims, 1 Drawing Sheet

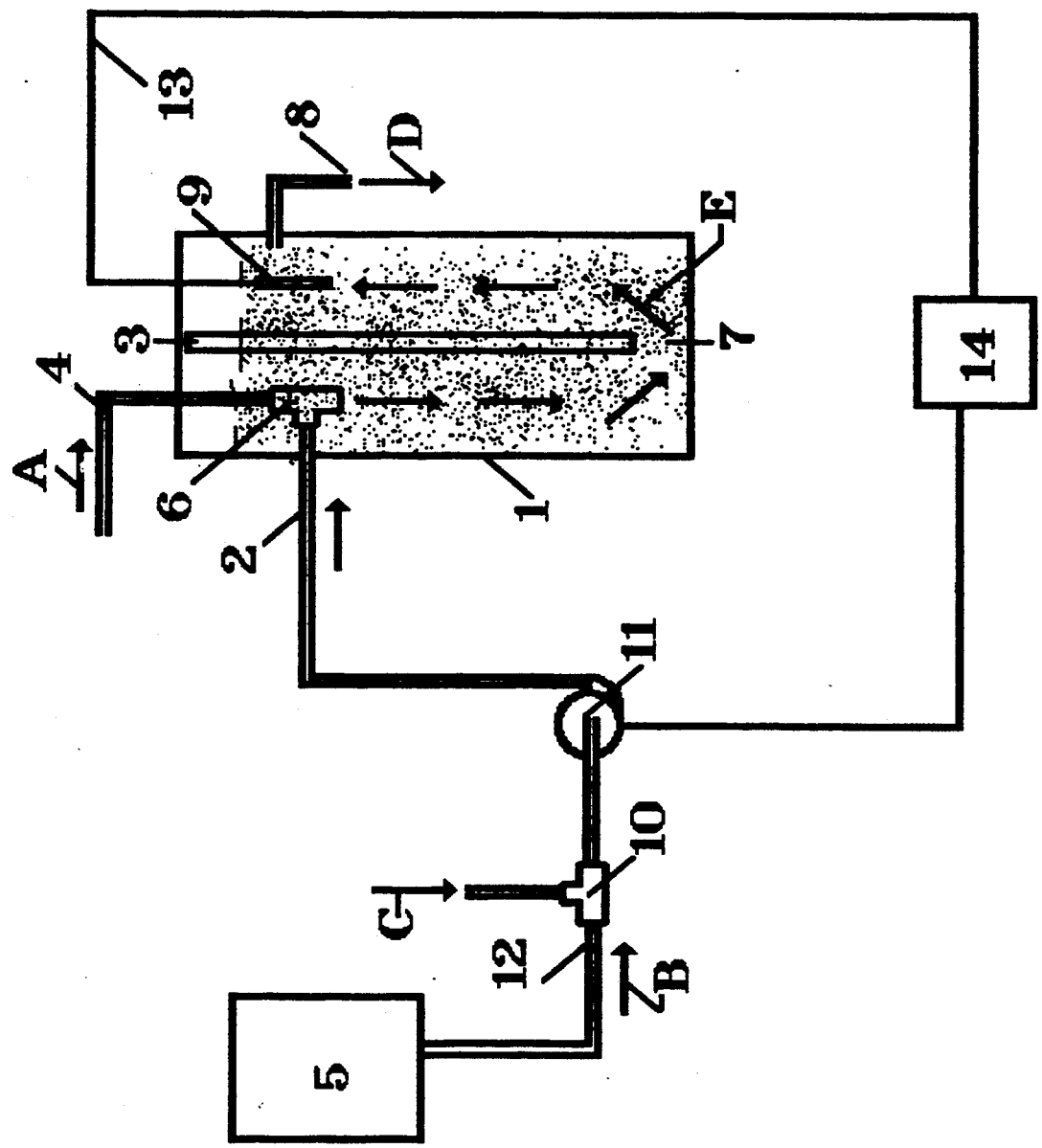

CONTINUOUS TREATMENT OF CHROMIUM BEARING WASTE WATER

BACKGROUND OF THE INVENTION

The present invention relates to composition and method for treatment of industrial waste water, for example from metal plating operations which commonly include chromic acid. Chromic acid of the waste water is considered toxic and must be treated for removal prior to introduction of waste stream into sewage systems.

In the prior art, waste water streams including chromic acid have been treated with chemical reducing agents to form trivalent chromium. This is followed by a treatment with alkaline materials to precipitate chromic hydroxide which is insoluble and can be removed from the effluent prior to introduction of the water into the sewage or waste water systems.

In general all prior art processes have required the pH of the water be first lowered with acid to facilitate the chemical reduction. The reduction reaction is controlled by measure of the oxidation-reduction potential. In another step the pH of the solution is then increased to precipitate the hydroxide. Such prior art methods have required at least 3 vessels, two pH monitors and one oxidation-reduction potential monitor.

Accordingly, prior art methods are expensive from the standpoint of capital investment and labor because of the multiple steps. Additionally. The need to monitor each step is subject to error and the inadvertent release of toxic material Additionally, the prior art methods are expensive because of the multiple chemicals required.

No prior art process is known wherein chromic acid can be easily and efficiently removed in a continuous process in a one step chemical reaction which is easily controlled.

SUMMARY OF THE INVENTION

The present invention provides a new, useful, highly effective and inexpensive method and composition for treating solutions including chromic acid of the type typically recovered from metal plating operation.

Methods within the scope of the present invention include addition of stoichiometric amounts of hydrazine to a chromic acid solution where the pH of the solution is increased to at least 7, where it has been unexpectedly found that the chromic acid concentration approaches "0".

The reaction is:

$$4H_2CrO_4 + 3N_2H_4 \rightarrow 4Cr(OH)_3 + 3N_2 + 4H_2O$$

While processes within the scope of the present invention will operate satisfactorily at a pH of 7 it has also been found that a slight increase in pH brought about by further hydrazine addition will cause virtually complete precipitation of all chromium as insoluble chromic hydroxide. In fact at a pH of 8-9 all chromic hydroxide is precipitated. The method and reactant within the scope of the present invention have been found highly effective for removal of virtually all chromic oxide from an effluent stream and can reduce the concentration to a level acceptable for disposal of the liquid.

The reaction of hydrazine with chromic acid reduces the chromium concentration to low levels and it has been unexpectedly found that use of a minor amount of cobalt salt will act as a catalyst to drive the chromium reaction rapidly toward completion.

Briefly, the present invention provides a composition and process for the treatment of waste water containing chromium compound, for example water from a plating operation which includes significant concentration of a toxic chromium compound such as chromic acid. The chromium bearing solution is mixed with sufficient amount of hydrazine, which can include selected minor concentrations of a cobalt salt, to react with the chromium compound and render it insoluble. The chromium bearing water is introduced to a vessel which can have a baffle so that water introduced on one side of the baffle flows along a side of. then under the baffle and overflows on the other side. The hydrazine which can include cobalt salt, is introduced to the incoming water at a rate to control the pH of the effluent from the vessel at a selected value of pH sufficient to remove all chromium from the effluent.

While one example of a method and material within the scope of the present invention is illustrated in the accompanying drawing and described hereinafter it will be understood that other arrangements and methods for use of the composition within the scope of the present invention will occur to those skilled in the art upon reading the disclosure set forth hereinafter.

DETAIL DESCRIPTION OF THE DRAWINGS

The Figure illustrates an arrangement within the scope of the present invention and an example of a method utilizing a composition within the scope of the present invention. A tank 1 is provided in which an effluent stream "A" is to be treated. The effluent stream "A" includes the chromic acid to be removed by a method which uses a composition within the scope of the present invention which has the ability to be easily controlled to accommodate variations in the concentration of the chromic acid in the stream.

The chromic acid stream "A" is introduced through inlet 4 in tank 1 to a mixing tee 6. Simultaneously, a stream of hydrazine "B" is provided to an inlet 12 to a pump 11 and through a conduit 2 to the mixing tee 6 where the water/chromic acid and the hydrazine are mixed.

It has been found that at least stoichiometeric amounts of hydrazine must be mixed with the chromic acid in order to effectively remove chromic acid from the stream "A". It has also been found that the process can be controlled by means of pH where a pH sensor 9 is provided adjacent an effluent overflow 8 where the chromium free effluent "D" is emitted from the system. A lead 13 is provided to supply the pH signal to a controller 14 which is adapted to control the speed of operation of the pump 11 thus regulating the flow rate of hydrazine to the vessel 1 to maintain the desired pH.

A baffle 3 can be located within the vessel 1 and an opening 7 is defined in tank 1 below the baffle where the baffle extends entirely across the vessel so all of the fluid being treated must flow around the baffle.

The fluid in the example shown in the drawing flows downwardly on one side of baffle 3 and upwardly on the opposite side to the overflow 8 as shown by arrows E. The amount of hydrazine introduced must, as previously stated be sufficient to maintain the pH of the effluent at at least pH 7.0. However, in practice the pH can beneficially be maintained between 8 and 9 with the use of very little excess hydrazine to provide a cushion to accommodate any drastic changes in the concentration of chromic acid in the waste water "A". The reaction is a oxidation-reduction reaction in which chromium is reduced and nitrogen is oxidized as previously described.

Since the pH increases as chromic acid is removed. The reaction can be easily controlled as though it were a simple acid base neutralization.

As shown in the drawing the entire procedure can be carried out in one vessel as opposed to the multiple vessels required in the prior art. Insofar as residence time is concerned, a time sufficient for the completion of the reaction is all that is required and it has been found that in general a calculated residence time of two hours within the vessel is more than adequate. In cases where the cobalt/hydrazine composition with the scope of the present invention is used the residence time can be substantially reduced.

In accordance with the present invention has been found that cobalt salts such as cobalt chloride added in small concentrations to the hydrazine steam act as a catalyst to drive the reaction toward completion at a faster rate Small amounts of the cobalt salt, typically less than 1.0% and in some cases 0.1% reduces the chromic acid concentration to negligible levels in a shorter time.

The use of cobalt salt also increases the rate of the reaction so that the volume of the tank can be reduced and in some cases simple mixing procedure could be used The cobalt salt can be either added as a solution to the hydrazine "B" in a mixing tee 10 or the cobalt can be mixed with the hydrazine in a tank 5 in proper concentration prior to introduction to the vessel The concentration of cobalt salt can be present in the range necessary for effective catalysis.

It will be understood that the foregoing is but one example of a method and apparatus within the scope of the present invention and that other methods and apparatus also within the scope of the present invention will occur to those skilled in the art upon reading the disclosure hereinbefore.

The invention claimed is:

1. A method for treating wastewater containing chromium compounds in the +6 oxidation state, consisting essentially of the steps of mixing said wastewater with hydrazine which contains a selected concentration of a cobalt salt to provide cobalt ions which provide a catalytic effect for the reduction of chromium in said +6 state to chromium in the +3 state, wherein sufficient hydrazine is introduced to maintain said mixture at a pH of at least about 7.

2. The invention of claim 1 wherein said cobalt salt is cobalt chloride.

3. The invention of claim 1 wherein said pH is maintained in the range of 8–9.

* * * * *